April 3, 1945.  J. KANTOR  2,372,899
BOTTLE FILLER AND SIRUPER
Filed July 12, 1941  2 Sheets-Sheet 2
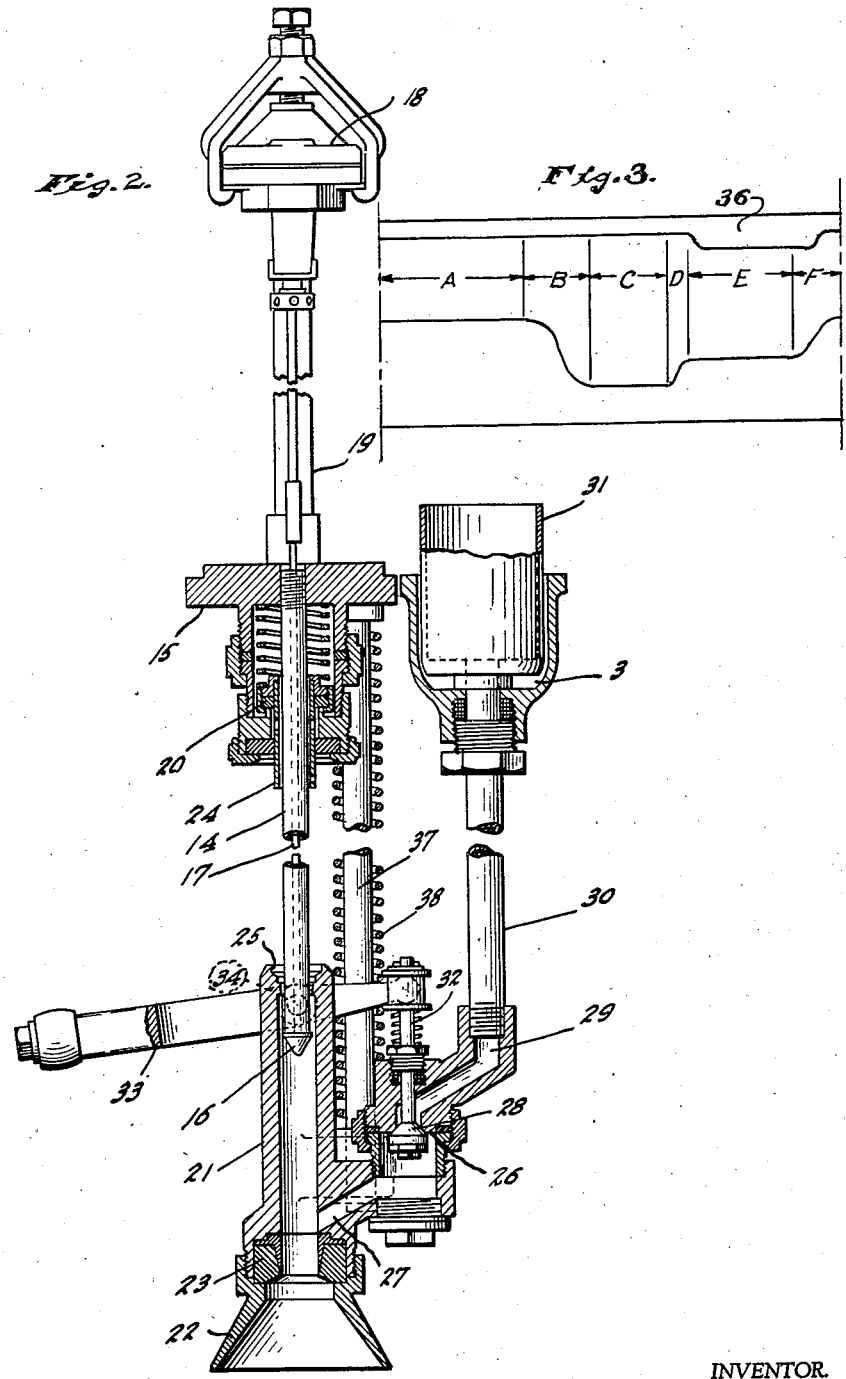

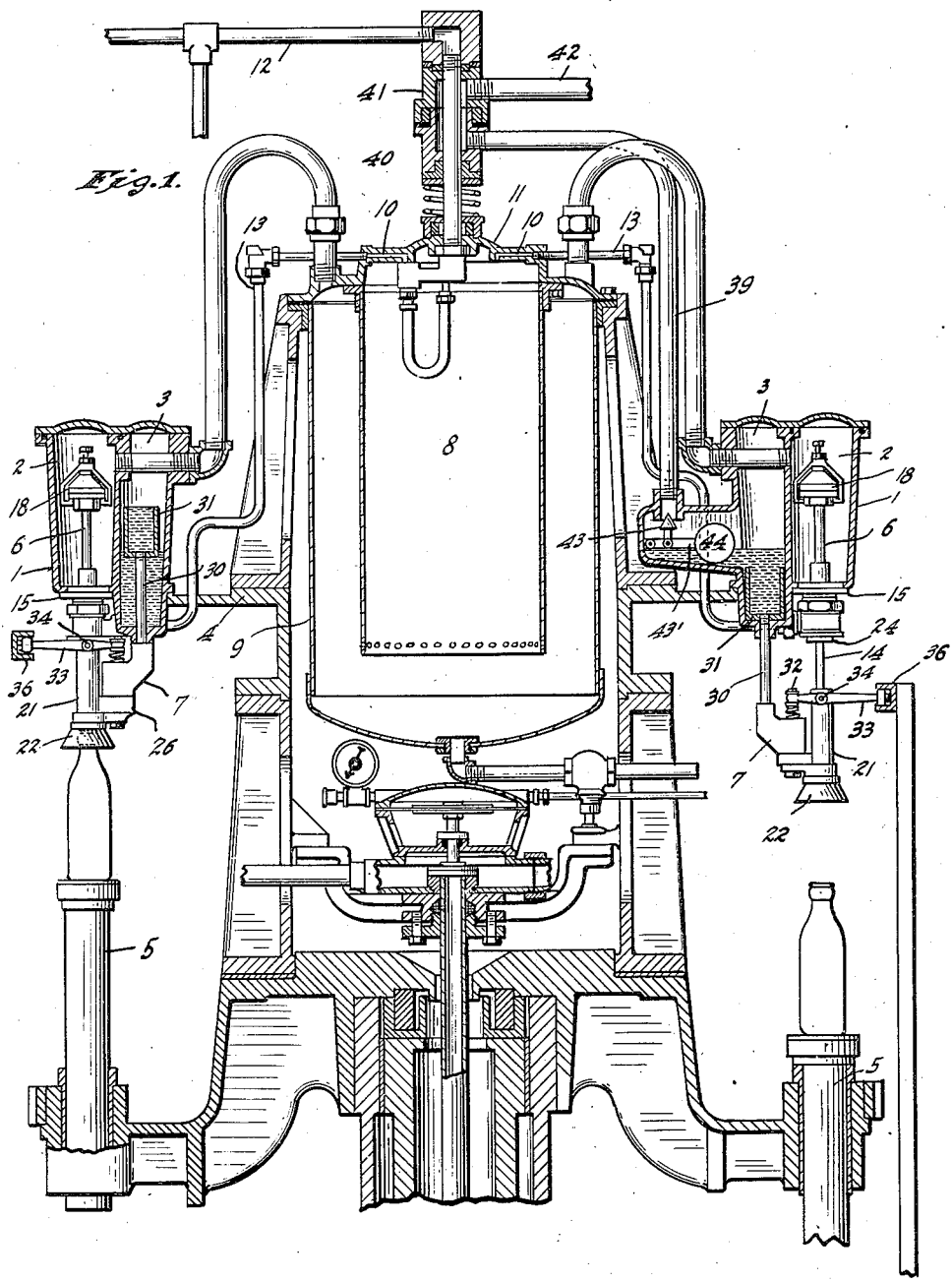

Patented Apr. 3, 1945

2,372,899

UNITED STATES PATENT OFFICE 2,372,899

BOTTLE FILLER AND SIRUPER

James Kantor, Chicago, Ill., assignor to The Liquid Carbonic Corporation, Chicago, Ill., a corporation of Delaware Application July 12, 1941, Serial No. 402,049

5 Claims. (Cl. 226—98)

The present invention relates to improvements in apparatus for filling containers with carbonated beverages.

More particularly, the invention relates to an apparatus for handling that type of carbonated beverage in which there is first introduced into the container a measured quantity of sirup and then a supply of carbonated water is introduced into the container for mixing with the sirup to provide a carbonated beverage.

It is one of the objects of the present invention to provide a machine wherein the sirup and carbonated water may be introduced into the container substantially at the same time to thereby avoid the necessity of first passing the container through a separate machine, generally referred to in the commercial art as the siruper and then through the machine for introducing the carbonated water.

For the purpose of disclosing the invention I have illustrated an embodiment thereof in the accompanying drawings, in which Fig. 1 is a longitudinal sectional view of so much of a filling machine embodying my invention as is necessary for illustrating;

Fig. 2 is an elevation partly in section of a filling valve; and

Fig. 3 is a development of the filler cam and the associated siruper cam.

In the embodiment of the invention illustrated, I provide a filling tank 1 which is preferably doughnut-shaped and is divided vertically into a filling chamber 2 and a siruping chamber 3. This tank 1 is supported on a suitable rotating head 4 which head also carries a plurality of vertically reciprocating container supports 5. The tank 1, in the chamber 2, is provided with a plurality of filling valves 6 through which the carbonated water is adapted to be dispensed into the container carried by its corresponding support 5. Also associated with the chamber 3 is a sirup filling valve 7 which is adapted to dispense a measured quantity of sirup to the container immediately prior to the delivery thereto of the carbonated beverage.

The water filling mechanism is of the counter-pressure type of filler wherein counter-pressure air is admitted to the container initially, which counter-pressure air is sufficient to counterbalance the atmospheric pressure above the liquid in the tank chamber 2 so that the liquid will be permitted to flow into the container under merely the head of the liquid in the chamber 2 and the parts are so arranged that by the time the container is filled to the proper level the pressures will be so counterbalanced that the liquid flow will stop at this point. To this end, associated with the tank chamber 2 is a pressure chamber 8 which is arranged within a tank 9. This tank 9 is adapted to contain liquid, generally water, which, under the influence of the air pressure admitted to the tank 8, which will have a tendency to force the liquid in the tank 9 upwardly, will determine the counter-pressure adapted to be admitted to the filling valve 6 and through the filling valve to the container. This counter-pressure is admitted through controlled ports 10 in the head 11 and from a suitable air pressure supply 12. These ports 10 are connected through the medium of conduits 13 with the respective valves 6 and the arrangement is such that the counter-pressure will be admitted successively to the filling valves during the rotation of the machine.

For a fuller description of the operation of machines of this character, and particularly the filling valve thereof, reference may be had to applicant's Patent 2,239,364, dated April 22, 1941.

Each of the filling valves comprises a filling tube 14 which projects downwardly from the bottom 15 of the filling chamber 2 and is adapted to be projected into the container as the container is elevated toward the same through the reciprocating support 5. The lower end of the tube 14 is provided with a controlling valve 16 mounted at the bottom end of a valve rod 17 which extends upwardly into a diaphragm chamber 18 which chamber is supplied with a diaphragm adapted to be operated through the medium of air pressure supplied to the container and through the tubes 19 to the diaphragm chamber. The admission of the air pressure to the diaphragm chamber 18 and to the container is controlled through the medium of a vertically movable valve 20 surrounding the tube 14 and adapted to be operated by the vertical movement of the container, it being remembered that this valve 20 is connected by the conduit 13 with the air pressure supply.

Vertically reciprocated on the tube 14 is a bell 21 having a bottle receiving bell mouth 22 at its lower end and provided with a sealing gasket 23. This bell 21, as the container or bottle, hereinafter referred to as bottle for convenience, is raised, makes contact with the neck of the bottle sealing the mouth thereof and through said contact and the continued upward movement of the bottle is raised until the tube 24 of the valve 20 engages a seat 25 on the top of the bell to thereby connect the bell with the source of air supply. This movement also projects the filling tube 14 into the container so that as the air pressure flows into the container through the tube 24 and the bell 21 and also into the diaphragm chamber 18, the bottle will be filled with the counter-pressure air and, through this counter-pressure air acting on the diaphragm through the diaphragm chamber 18, the valve 16 will be opened permitting a flow of the carbonated water into the container.

The bell 21 also carries a siruping means comprising a valve structure 26 communicating through the port 27 with the interior of the bell 21. This valve structure includes a valve 28 controlling the flow of sirup through the port 29. This port, through the medium of the pipe 30, is connected with a sirup cup 31 which cup, as illustrated in Fig. 1, is arranged in the sirup chamber 3. Normally with the bell 21 and siruping structure including the cup 31 in their lowered position, the cup 31 is immersed in the sirup within the sirup chamber 3, as illustrated in Fig. 1. However, with the raising of the bell 21 through the elevation of the bottle, the siruping valve structure and valve cup will be raised until the cup is above the level of the siruper in the sirup chamber 3 and at this point the valve 28 will be opened to permit the measured quantity of sirup within the cup 31 to flow into the container through the ports 27 and 29 and through the bell 21.

The opening of the valve 28 is effected through the medium of the relatively stationarily mounted cam 36 prior to the time the seat 25 of the bell engages the tube 24. To this end, the valve stem 32 is connected with one end of a lever 33 pivoted at 34 at the top of the bell 21. The opposite end of this lever rides in the stationarily mounted cam track 36 which is circular and surrounds the orbit of movement of the filling valves. As shown in Fig. 3, between the points C, the bottle support 5 is in its lowered position due to the contour of the filler cam and in a position to receive the bottle or container to be filled. At the point D, the bottle is raised to a semi-filling position, that is, it is raised sufficiently high to engage the bell mouth 22 and raise the bell 21 sufficiently to raise the sirup cup 31 above the sirup level in the sirup tank. This elevation of the bell 21, however, is not sufficient to cause it to engage the seat 25 with the valve 24 for the purpose of connecting the bell with the source of air supply. As the result, the filler valve remains closed, although the cup 31 is raised in a position to deliver sirup to the container, with the container top in engagement with the throat 22. Between the points E, this raised position is maintained and it will be noted that between these points, the cam 36 is so developed as to engage the roller on the lever arm 33 pivoted at 34 to the bell 21 and having at its opposite end engaging the stem 32, thus lowering the valve 28 and opening the same to permit the sirup to flow into the container through the port 27. However, it is to be observed that during the inflow of the sirup, the carbonated water filler valve remains closed. At the point F, the bottle continues to raise as the result of the development of the filler cam and between this point and the points A, the bell has been raised sufficiently to open the filler valve and the carbonated water is discharged into the container.

The bell 21 is guided in its vertical movement by a guide rod 37 depending from the bottom 15 of the tank and passing through the valve structure 26 as illustrated in dotted lines in Fig. 2 and for biasing the bell 21 and with it the siruping valve structure I provide a coiled spring 38 surrounding the guide rod 37.

Sirup is supplied to the siruping chamber 3 from a suitable source of supply through a supply pipe 39 which pipe is connected to one side of a coupling member 40, the opposite coupling member 41 being connected by the pipe 42 with the sirup supply. The flow of sirup into the siruping chamber 3 from the pipe 39 is controlled by a valve 43 mounted on a float arm 43' pivotally secured to one wall of the sirup chamber and having at its free end a float 44. It is obvious, as illustrated in Fig. 1, that as the sirup level drops, the float 44 will drop with the same, opening the valve 43 and permitting the inflow of sirup. When, however, the sirup has flowed in sufficiently to raise the float 44 to the desired level, this raising of the float will close the valve 43 and shut off further inflow of the sirup.

I claim as my invention:

1. In a container filling machine, in combination, a carbonated liquid tank, a siruping tank, a filling tube associated with said liquid tank, a valve for controlling the flow of liquid from said carbonated tank through said tube, a bell surrounding said tube reciprocably mounted on said tube and adapted to make sealing contact with the neck of the container to be filled and having a longitudinal passage therein, means for effecting a relatively reciprocating movement between the container and said tube for projecting said tube into the container and reciprocating the bell on said tube, a measuring cup arranged in said siruping tank and connected with said bell and reciprocating therewith, a valve controlling the flow of sirup from said cup to said bell, means for opening the liquid controlling valve, a cam, and operating means connected to said sirup controlling valve and engaging said cam for opening the sirup controlling valve when the top of said cup has been raised above the sirup level and prior to the opening of the liquid valve.

2. In a container filling machine, in combination, a sirup container, a liquid container, a filling tube associated with said liquid container, a valve controlling the flow of liquid through said tube, a bell reciprocating on said tube, means for effecting a relatively reciprocating movement between said tube and container for projecting the tube into the container and reciprocating said bell on said tube, means for opening the valve whose operation is effected by movement of the bell on said tube, means for delivering a measured quantity of sirup from the sirup container to the bell including a valve, a cam, and operating means engaging said cam and connected to said sirup controlling valve for effecting the opening of the sirup valve prior to the opening of the liquid valve.

3. In a container filling machine, in combination, a siruping container, a liquid container, a filling tube connected with the liquid container, a bell reciprocating on said tube and adapted to make sealing contact with the mouth of the container to be filled, means for effecting a relatively reciprocating movement between the container to be filled and said tube for projecting said tube into the container and causing a reciprocation of the bell on said tube, means for supplying a counter-pressure through said bell to said container including a valve, a valve controlling the flow of liquid through said filling tube, the opening of said two valves being effected by the vertical movement of said bell, means independent of said first-mentioned means for delivering a measured quantity of sirup from said sirup container to said bell including a valve, a cam, and operating means engaging said cam and connected to said sirup controlling valve for opening said valve to admit the supply of sirup to flow to said container prior to the admission of counter-pressure and liquid to said container.

4. In a container filling machine, in combination, a rotary filling tank having a sirup chamber and a liquid chamber, a filling valve for said liquid chamber including a filling tube and a reciprocating bell, means for effecting a relative movement between the container to be filled and said tube for projecting said tube into the container and reciprocating said bell, a filling valve for said sirup chamber including the sirup measuring means and a valve for controlling the flow of sirup to said reciprocating bell, a cam, and operating means connected to said sirup controlling valve and engaging said cam for operating the sirup control valve to admit sirup to said bell prior to the operation of said liquid controlling valve to admit liquid to the container.

5. In a filling machine, in combination, a rotary filling tank having a liquid compartment and a sirup compartment, a filling valve associated with said liquid compartment including a filling tube and a reciprocating bell, means for effecting a relatively reciprocating movement between the container to be filled and said tube for projecting said tube into the container and reciprocating said bell, a valve for controlling the flow of liquid through said tube, a filling valve for controlling the flow of sirup from said sirup chamber including a measuring means and a valve for controlling the flow of sirup from said measuring means to said bell, and a cam, and operating means connected to said sirup controlling valve and engaging said cam operated by the rotary movement of said tank for opening the sirup controlling valve prior to the opeing of the liquid controlling valve.

JAMES KANTOR.